July 16, 1957    H. TEGTMEYER ET AL    2,799,453
SLIDE RULES
Filed June 15, 1953    2 Sheets-Sheet 2
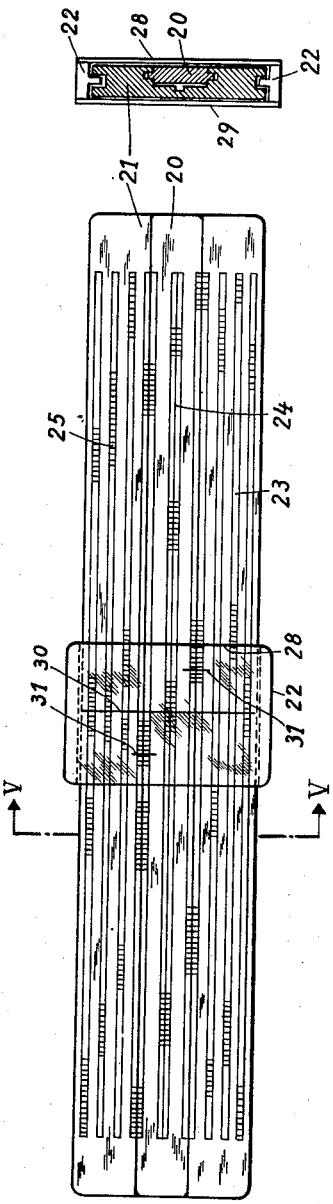
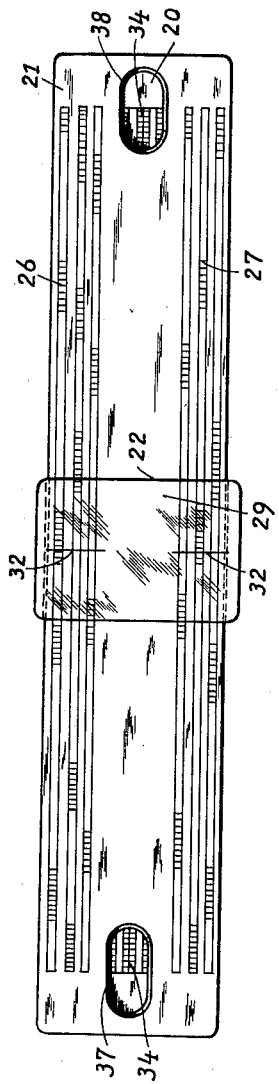
INVENTORS
H. Tegtmeyer
H. Bachmann
ATTYS

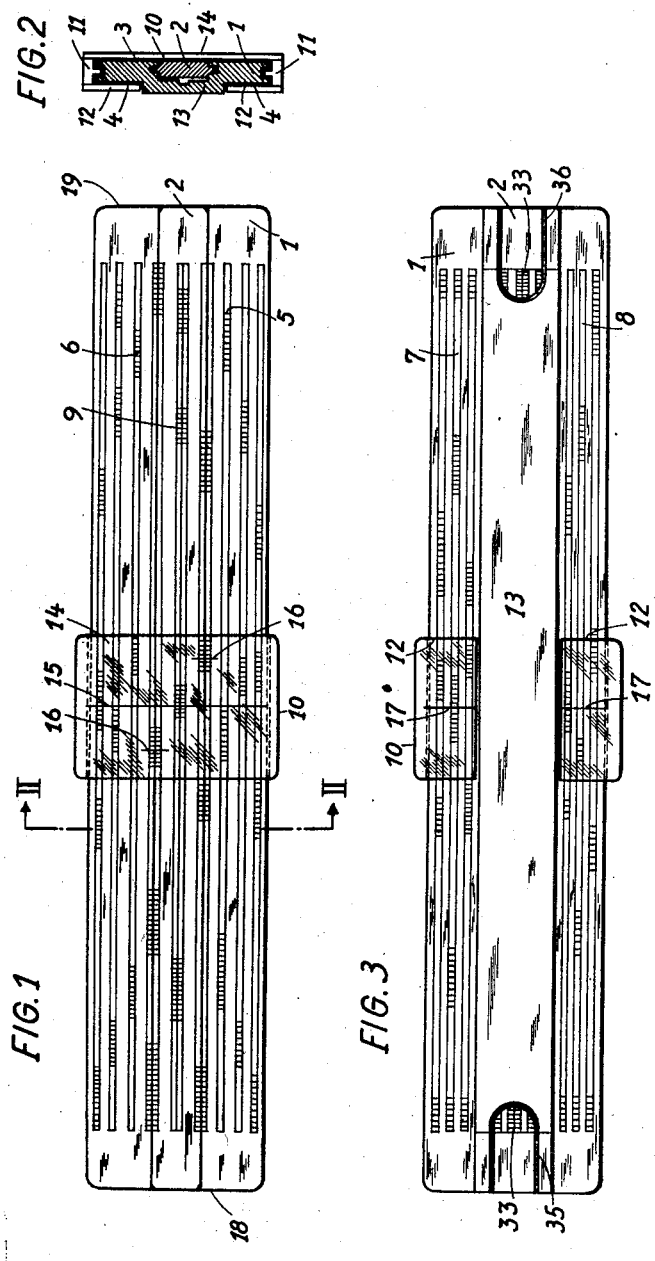

United States Patent Office 2,799,453
Patented July 16, 1957

2,799,453
SLIDE RULES

Heinrich Tegtmeyer, Geroldsgrun, and Harald Bachmann, Stein, near Nurnberg, Germany, assignors to A. W. Faber-Castell, Stein, near Nurnberg, Germany Application June 15, 1953, Serial No. 361,764
Claims priority, application Germany July 15, 1952
5 Claims. (Cl. 235—70)

The present invention relates to a slide rule provided with a slide at one side and with scales at the back of the frame or fixed part of the rule. Slide rules of the kind so far known having a slide on one side of the rule are generally provided with centimetre or inch scales on the back or at any rate with scales having no connection with the scales on the front side of the rule. Slide rules also exist having scales both at the front and at the back of the rule, the scales in question corresponding with one another. The slide however in such slide rules passes right through the frame so that the frame has to be made in two parts held together by straps at each end. This has the effect of reducing the effective length of the rule, as those parts on which the straps are situated cannot be used for the scales. The movements of the cursor are also limited thereby as it abuts against the straps. The scales consequently have to be made shorter at each end than the distance between the straps by an amount equal to half the length of the cursor to enable the line on the cursor to be adjusted to the zero point of the scale. The total length of slide rules of this type is thus always very large, so that they are unsuitable for use as pocket slide rules. It also prevents the use of extra divisions at the ends of the scales.

The present invention obviates these drawbacks. It relates to a slide rule having a slide on one side, the scales on the back of the rule corresponding with scales on the front and/or the slide scales, a cursor which passes along the front and rear sides of the rule simultaneously establishing a connection between the individual scales. In the slide rule according to the invention, straps are no longer required for holding the frame part together, as the part containing the slide is constructed as a single part, or at any rate so as to form a single part. The absence of straps enables the cursor to be pushed backwards and forwards over the entire rule, and the scales to be continued almost as far as the edges, so that the full length of the rule can be utilised. The length of the slide rule can thus be kept within reasonable proportions so that it can be designed for pocket use. The cursor for establishing a connection between the individual scales is provided at each of its sides sliding along the front and rear sides of the frame with at least one line, the position of these lines being adapted to suit each other so as to preserve the correlation between the different scales.

The frame and the cursor sliding on it may be constructed in several ways. The frame, for example, may have the customary rectangular shape, and the cursor would then preferably take the form of a closed member embracing the frame on all sides. Instead of this type of construction, the cursor could be made so that it has a U-shaped cross-section, the sides being provided with inwardly projecting extensions, the latter taking the form of window elements sliding along the rear side of the frame. If, at the same time, while using a cursor of the above kind, a raised part is provided at the back of the frame extending higher up than the thickness of the cursor, the cursor can also be slid along even when the slide rule is lying on a table or other support.

Two embodiments of the present invention are illustrated in the accompanying drawings.

Figure 1 is a view of the front side of a slide rule according to the invention.

Figure 2 is a section on the line II—II of Figure 1.

Figure 3 is a view of the back side of the slide rule according to Figure 1.

Figure 4 shows a second embodiment of a slide rule according to the invention, looking on to the front side.

Figure 5 is a section on the line V—V of Figure 4.

Figure 6 shows the back side of the slide rule according to Figure 4.

Figures 1 to 3 show a slide rule having a one-piece frame 1 and provided with a slide 2 on one of its sides. The frame 1 is provided both at its front side 3 and also at its rear side 4 with scales 5 to 8. The slide 2 is also provided with corresponding scales 9. According to the invention the scales 5 to 9 are adapted to one another and they correspond with one another through the cursor 10. The cursor 10 is U-shaped in cross-section, its side parts 11 being provided with inwardly projecting parts 12, these latter parts forming windows which slide along the rear side of the frame. A central raised part 13 is provided on the back of the frame 1, this central part being higher up than the thickness of the window elements 12, this device enabling the cursor to be slid along even when the slide rule is resting upon a table or some other support. The cursor 10 is provided both at its front side 14 and also on its rear window parts 12 with lines 15, 16 and 17, these being adapted to each other and enabling operations to be effected with the individual scales 5 to 9 of the rule corresponding to each other.

The slide rule according to the invention possesses the advantage that the scales can be carried almost to the ends 18 and 19 of the rule so as to utilise the entire length and provide a compact form of construction. A slide rule of this kind is particularly suitable for construction as a pocket slide rule.

The action of the slide rule described in Figures 4 to 6 is similar to that of the slide rule which has been described. The slide 20 is also arranged in this form of construction at one side of the single-piece frame 21. The frame 21 however in distinction to the first form has an almost rectangular cross-section and is embraced right round by the cursor 22 constructed as a closed member. In this construction as well, the individual scales 23, 24, 25 of the front side and of the slide correspond with the scales 26, 27 of the back side, connection being established between the scales by the cursor 22. The latter is provided both at the front 28 and at the back 29 with lines 30, 31 and 32 adapted to one another.

The adjustment or reading of the scales 33 and 34 at the rear side of the slide 2 or 20 takes place both in the embodiment of Figures 1 to 3 and in that of Figures 4 to 6 in the normal manner by means of index windows 35 and 36 or 37 and 38, these being provided with covers of celluloid or some other transparent material and having suitable reading-off lines.

We claim:

1. A slide rule comprising a unitary body member formed with intercooperating scales on both sides thereof, a central trough formed in one side of said body member and extending longitudinally of said body from end to end, a slide formed with scales adapted to cooperate with the scales of said body member and disposed in said trough, and a cursor embracing said body member for simultaneously passing over both sides thereof and establishing a relation between the respective scales and the said trough formed to be continuously open from end to end of the body whereby the two body parts formed by the said trough are connected only by the body portion extending beneath the trough.

2. The invention as set forth in claim 1, wherein the said cursor includes an indexing line on both sides thereof, the said lines positioned in fixed relationship to each other.

3. The invention as set forth in claim 2, wherein the said cursor is substantially U-shaped in cross section, and comprises inwardly projecting transparent extensions formed on the lateral legs of the U to sweep over said body.

4. The invention as set forth in claim 3, including a raised longitudinal strip formed on the other side of said body member and extending from end to end, the thickness of said strip being greater than the thickness of said transparent extensions.

5. A slide rule comprising a unitary body formed with intercooperating scales on both sides thereof, a central trough formed in one side of said body and extending continuously from end to end, a slide having scales to co-operate with the scales of said body disposed in said trough and being of such thickness that the said one side of the body is in a single plane, a raised longitudinal strip formed on the other side of said body extending from end to end and joining between the body portions formed by the trough, a cursor embracing said body and having inwardly projecting transparent legs extending towards the said raised strip, the thickness of the strip being greater than the thickness of the legs.

References Cited in the file of this patent

UNITED STATES PATENTS

| | | |
|---|---|---|
| 1,108,480 | Tomlinson | Aug. 25, 1914 |
| 1,181,672 | Keuffel | May 2, 1916 |
| 1,329,902 | Hemmi | Feb. 3, 1920 |
| 2,138,879 | Poole | Dec. 6, 1938 |
| 2,486,748 | Koenig | Nov. 1, 1949 |